3,218,301
VAPOR PHASE SULFONATION OF
POLYMER PARTICLES
Herbert R. Moody, Huntingdon Valley, and Ralph W.
Edwards, Elkins Park, Pa., assignors to Rohm & Haas
Company, Philadelphia, Pa., a corporation of Delaware
Filed Feb. 18, 1960, Ser. No. 9,554
7 Claims. (Cl. 260—79.3)

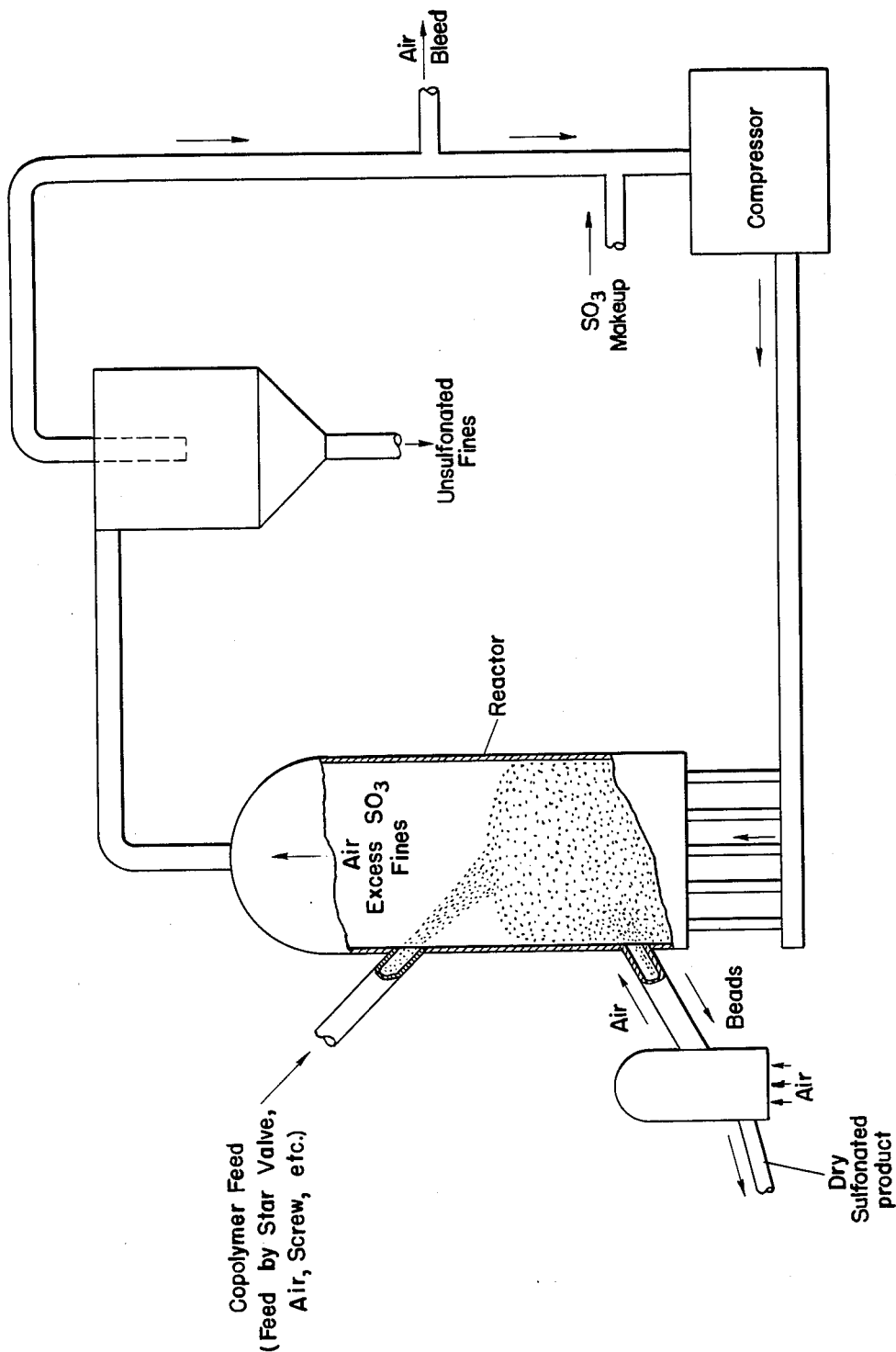

This invention concerns processes for sulfonating vinyl polymers, including homopolymers and copolymers, which contain aromatic nuclei. More particularly, it concerns processes for sulfonating cross-linked copolymers which possess a macro-reticular structure. It also concerns processes for producing the substantially anhydrous acid form of sulfonic acid type cation exchange resins which possess a macro-reticular structure.

It is known in the prior art to sulfonate vinyl polymers, including copolymers, which contain aromatic nuclei, to introduce sulfonic acid groups into the aromatic nuclei. Thus, as stated in U.S. Patent 2,366,007, cross-linked copolymers such as styrene-divinylbenzene copolymers can be sulfonated by treating with concentrated sulfuric, oleum or chlorosulfonic acid. While such sulfonated products and the processes used to manufacture them are relatively satisfactory, there are very definite disadvantages to both the products and the processes. When employing concentrated sulfuric or oleum, large excesses of both sulfonating agents must be used in order to be able to agitate the reaction mixture in order to dissipate the exotherm which develops. Thus, as much as 8 to 9 moles of sulfuric acid or oleum per "mole" of aromatic nucleus must be used. Since the maximum degree of sulfonating practically possible is one sulfonic group per aromatic nucleus, and since it is not practically possible to recover and re-use the excess acid, the cost of the product is substantially increased. Often more serious, and frequently just as costly, is the disposition of this excess acid. The sulfuric acid or oleum must be removed from the sulfonated polymer and large volumes of dilute acid result from the subsequent washing. The disposal thereof represents a serious problem.

Since sulfonating times must be long and the temperatures must be high, some decomposition of the polymer occurs. Furthermore, as the degree of cross-linking increases, the polymer becomes more and more difficult to sulfonate and longer times and higher temperatures must be used, resulting in proportionately higher decomposition of the polymer. Since a high degree of cross-linking is desired for maximum chemical and physical resistance, serious difficulties arise.

One disadvantage in the use of chlorosulfonic acid for sulfonation is that hydrogen chloride is evolved during the reaction and expensive highly acid-resistant equipment is required. Chlorosulfonic acid is also appreciably more expensive than sulfuric acid.

As set forth in U.S. Patent 2,500,149, the sulfonation process can be improved by swelling the copolymer in a solvent of specified properties prior to sulfonation. As this solvent must be imbibed readily by the copolymer, it must be chosen from the class capable of dissolving polystyrene, such as chlorinated aliphatic hydrocarbons. The preferred method consists of forming the copolymer in the absence of such solvent, thereafter allowing such solvent to be imbibed.

While the process set forth in U.S. Patent 2,500,149 does overcome one disadvantage of the processes known prior to its issuance, it still shows many of the disadvantages of the prior art processes. While the use of the process set forth in this patent does result in less cracking of the beads, it still requires the use of large excesses of a sulfonating agent, such as sulfuric acid and "reacting temperatures between 100° C. and 200° C." The disadvantages of these two conditions have been discussed hereinbefore in connection with U.S. Patent 2,366,007.

The process set forth in U.S. Patent 2,733,231 is somewhat similar to U.S. Patent 2,500,149 in that the copolymer is swollen prior to sulfonation. In the former patent, however, liquid sulfur dioxide is used to swell the copolymer with subsequent sulfonation with sulfur trioxide or chlorosulfonic acid. However, the low boiling point of $SO_2$ required refrigeration of the reaction mixture in order to maintain the $SO_2$ in the liquid state, and subsequent removal and recovery of the $SO_2$ is required.

The macro-reticular structured copolymers employed in the present invention may also be sulfonated in the liquid phase using the sulfonating agents hereinbefore set forth and, although they sulfonate more rapidly, the other disadvantages of these sulfonating processes still obtain.

It has been unexpectedly found that macro-reticular structured cross-linked copolymers, as hereinafter described, can be rapidly and completely sulfonated by contacting them with sulfur trioxide in the gaseous phase. Not only are they sulfonated more completely and more rapidly, but the reaction conditions are milder and negligible destruction of the polymer occurs. By recycling the sulfur trioxide which does not originally react with the copolymer, quantitative utilization of the sulfur trioxide can be obtained. In other words, one mole of sulfur trioxide reacts with one "mole" of aromatic nucleus. Thus, the economics of the process are vastly superior to the economics of the hereinbefore described sulfonation processes, and there is no waste acid disposal problem.

Chlorosulfonic or fluorosulfonic acid may also be used for sulfonating in the vapor phase, but, because they yield hydrochloric and hydrofluoric acids respectively on sulfonation, they are not preferred.

The details of the processes for the manufacture of the macro-reticular structured copolymers employed in the present invention, as well as detailed descriptions of the copolymers themselves, appear in copending application Serial No. 749,526, filed July 18, 1958, and Serial No. 791,047, filed February 4, 1959, both assigned to the same assignee as the present invention, and these details are incorporated herein by reference.

The term "macro-reticular structure" as used in the specification, examples and the claims refers to a unique porous structure. Copolymers with this particular structure are prepared by copolymerizing, in suspension or in bulk, a monomer mixture of at least one monovinyl compound with at least one polyvinyl or polyvinylidene compound in the presence of a critical minimum amount of a compound which is a solvent for, or soluble in, the monomer mixture and which is insoluble in, or does not swell, the copolymer so formed. Such compounds have been termed "precipitants."

Introduction of the precipitant leads to two effects, the second effect undoubtedly depending on the first. By adding the precipitant to the monomer phase, the solubility in the monomer phase of any copolymer formed is decreased and the copolymer separates from the monomer phase as it is formed. This phenomenon is known as "phase separation." As the concentration of monomer in the polymerizing mass decreases due to polymerization, and as the concentration of resulting copolymer increases, the precipitant is more strongly repelled by the copolymer mass and is actually squeezed out of the copolymer phase leaving a series of microscopic channels.

These microscopic channels are separate and distinct from the micropores which are present in all cross-linked copolymers as is well-known to those skilled in the art (cf. Kunin, "Ion Exchange Resins," page 45 et seq., John Wiley & Sons, Inc., 1958). While said channels are relatively small in the commonly thought of sense, they are large when compared with the micropores hereinbefore referred to. Thus, as set forth hereinafter, the use of a precipitant results in the formation of an unusual and desirable structure. Since the rigidity of the polymer mass at the time of precipitant expulsion is important, it is not surprising that the desirable properties obtained increase with increasing polyvinyl or polyvinylidene content, i.e. increasing degrees of cross-linking. As as specific example, using a styrene-divinylbenzene copolymer, the process of the present invention is appreciably less effective below about 4% to 6% divinylbenzene content in the copolymer than it is at higher divinylbenzene levels. With this specific system, preferred effects are obtained with divinylbenzene content of from about 8% to about 25%, based on the weight of the monomer mixture.

The monomer mixture will polymerize without the addition of catalysts, but the reaction is very slow and free radical-generating catalysts are generally employed. Typical of such catalysts are the solvent-soluble organic peroxides such as benzoyl peroxide, tert-butyl hydroperoxide and the like. Azo catalysts such as azodiisobutyronitrile may also be employed.

The terms "suspension polymerizing" and "bulk polymerizing" are well-known to those skilled in the art, the former process comprising suspending, generally by means of agitation, the monomer or monomer mixture in a medium in which the monomer or monomer mixture is substantially insoluble. Surfactants and/or dispersing agents are generally used. The products prepared by suspension polymerization are in the form of spheres or beads, and are particularly suitable for use in the process of the present invention. In bulk polymerization processes, the resuting products are in the form of masses or chunks. They can, however, be reduced to the desired particle size by grinding or pulverizing.

Since the sulfonic acid group is the active cation-removing group in the products of the present invention and since the sulfonic acid group can only easily be introduced into an aryl nucleus, it is preferred that the major proportion of the polymerizate which is to be sulfonated, be made from polymerizable components that contain aryl nuclei. Thus, the polymerizate may be made by polymerizing a polyvinyl aryl compound alone, copolymerizing a plurality of polyvinyl aryl compounds, copolymerizing at least one polyvinyl aryl compound with at least one monovinyl aryl compound, copolymerizing a mixture of polymerizable compounds, the major proportion of the polymerizable compounds being either at least one polyvinyl aryl compound or at least one polyvinyl aryl compound and at least one monovinyl aryl compound.

Illustrative examples of suitable monovinyl aryl compounds which may be used are: styrene, vinyl toluenes, vinyl naphthalenes, vinyl ethyl benzenes, alpha-methyl styrene, chlorostyrenes, and vinyl xylenes.

Copolymers of the above monomers with monovinylene compounds, such as dialkyl maleates, dialkyl fumarates, dialkyl crotonates, dialkyl itaconates, and dialkyl glutaconates, are also possible.

Suitable polyvinyl and polyvinylidene compounds are set forth in detail in Serial No. 749,526.

Particularly preferred polyvinylidene monomers, commonly known as "cross-linkers," include the following: polyvinylaromatic hydrocarbons, such as divinylbenzene and trivinylbenzene, glycol dimethacrylates, such as ethylene glycol dimethacrylate, and polyvinyl ethers of polyhydric alcohols, such as divinoxyethane and trivinoxypropane.

Although, in general, monomers containing aromatic nuclei are preferred when the products of the present invention are to be used as cation exchange resins, other monoethylenically unsaturated aliphatic monomers may be employed depending on the use for which the final product is intended. Thus, there may be used from about 5 percent to about 95 percent of aliphatic unsaturated monomers. Suitable monoethylenically unsaturated monomers are also set forth in Serial No. 749,526, referred to hereinbefore, including monovinylidene monomers.

A typical macro-reticular structured styrene-divinylbenzene copolymer was prepared as follows:

A mixture of styrene (121.6 grams), technical divinylbenzene (38.4 grams containing 50% active ingredient), 87 grams of tert-amyl alcohol and 1 gram of benzoyl peroxide was charged to a solution of 6.5 grams of sodium chloride and 0.5 gram of the ammonium salt of a commercial styrene maleic anhydride copolymer in 174 grams of water. The mixture was agitated until the organic components were dispersed as fine droplets and then heated to 86° to 88° C. for 6 hours.

The resultant polymer pearls were filtered and washed with water and freed from excess water and amyl alcohol by drying at elevated temperature. The product was obtained in the form of white opaque spherical or spheroidal particles amounting to 145 grams. When the dried product was dropped into a fluid such as hexane, fine bubbles were seen to rise from the immersed particles due to displacement of air held within the void spaces of the resin by the organic fluid.

Another advantage of the process of this invention is that the anhydrous acid form of the sulfonated copolymer is produced directly. The anhydrous acid forms of macro-reticular structured sulfonic acid type cation exchangers are particularly useful as heterogeneous catalysts for a large number of acid-catalyzed reactions as set forth in copending application Serial No. 809,606, filed April 29, 1959, and assigned to the same assignee as the present invention. In using these sulfonic acid type cation exchangers as catalysts for acid-catalyzed reactions, the anhydrous acid form of the exchanger is used instead of other acidic catalysts, such as concentrated sulfuric acid. The macro-reticular structured sulfonic acid cation exchange resins, in addition to very effective catalysts, can be readily removed from the reaction mixture without the necessity for water-washing or neutralization of the reaction mixture. They can be re-used repeatedly without treatment and this factor results in processing economies. They are particularly suitable if it is desired to obtain the final product in a substantially anhydrous condition. Typical of the reactions for which they function as catalysts are: addition of acids to olefins, addition of olefins to phenols, polymerization of olefins, alykylation of aromatic hydrocarbons and other acid catalyzed reactions. Since it is important for use as a catalyst that water-removal from the resin be as complete as possible, and since the resin retains water tenaciously, the dehydration of the products produced by the prior art sulfonation processes is a time-consuming and expensive process. The products produced by the process of the present invention can frequently be used directly as catalysts for such acid-catalyzed reactions without the need for any additional purification or processing.

The process of the present invention can be carried out in several ways. Inasmuch as the macro-reticular structured copolymers are generally in bead form as a result of being produced by suspension polymerization, gaseous sulfur trioxide can be readily passed through a bed or column of the beads contained in a reactor vessel. If the copolymers are produced by bulk polymerization, they can be readily reduced to smaller particles by grinding and then treated in the same manner as the beads.

The beads or particles in the reactor may be stationary and the sulfur trioxide can be passed through the bed upflow or downflow at such a rate, if upflow operation is employed, that the particles are not lifted. A horizontal rotary reactor may also be used with baffles on the inside so that, as the reactor rotates, the beads or particles are carried to the top of the reactor and then fall down through the stream of sulfur trioxide. A preferred embodiment, however, employs upflow operation, the rate of flow of the sulfur trioxide or the sulfur trioxide-air mixture being such that the bed of beads or particles becomes fluidized and remains fluidized throughout the sulfonation period. Several important advantages accrue from this fluidized bed technique. In the first place, the copolymer beads become heavier as they are sulfonated; and the more completely sulfonated beads move towards the bottom of the fluidized bed. Thus, true counter-current operation is achieved in that the most completely sulfonated particles at the bottom of the bed meet the most concentrated sulfur trioxide stream. Conversely, the most dilute sulfur trioxide stream, near the top of the bed, is scrubbed by the beads with the lowest degree of sulfonation. There is a further completely unexpected advantage to the fluidized bed process. Some of the batches of macro-reticular structured copolymer prepared by suspension polymerization can contain small but finite and variable amounts of beads which do not have a macro-reticular structure. Under the sulfonation conditions employed, these beads are only very slightly sulfonated, and so gradually move to the top of the bed where they can be readily removed. Furthermore, by employing the fluidized bed technique as set forth hereinbefore, a continuous process is possible. In such a continuous process, the fully sulfonated beads are continuously removed from the bottom of a vertical reactor containing the fluidized bed of beads while unsulfonated copolymer particles are continuously fed into the top of the reactor. The unreacted sulfur trioxide is recycled.

The sulfonation process of the present invention is exothermic and, since it is generally preferred to operate at relatively low temperatures, it is necessary to control the amount of heat build-up in the reaction zone. This can be controlled by cooling the reactor by external cooling means. A preferred method of control is reducing the concentration of the $SO_3$ by diluting it with a gas which is inert under the reaction conditions employed. Air, nitrogen, helium, sulfur dioxide or carbon dioxide are typical of the gases which can be employed, with air being the preferred embodiment. Under the operating conditions of the present invention, the sulfur trioxide content of the influent gas should be from about 8 percent by volume to about 20 percent by volume. A preferred temperature range is from about 50° C. to about 100° C.

It is possible to use undiluted sulfur trioxide, but particularly with polymers containing a large number of aromatic nuclei, it is frequently difficult to dissipate the exotherm by practical means. However, with copolymers containing a small number of aromatic nuclei, higher concentrations of $SO_3$ can be used.

The rate of sulfonation will depend to some extent on the particle size of the copolymer particle, with the smaller particles sulfonating somewhat more rapidly than the larger. There is, however, not as much difference in rate as might have been anticipated. When the copolymers are prepared by suspension polymerization, the particles range in size from about 10 to about 50 mesh (or about 2000 microns to about 297 microns) with the bulk of the product in the 20 to 40 mesh (840 microns to 420 microns) range. The lower the operating temperature, the more difference will be noted in the effect of particle size on rate of sulfonation. At about 90° C., there was no difference in the rate of sulfonation between two cuts, one 20 to 30 mesh, the other 30 to 40 mesh. At about 55° C., the 20 to 30 mesh showed a lower rate of sulfonation than the 30 to 40 mesh cut.

Depending on the reaction conditions, the fully sulfonated beads will contain varying amounts of free sulfur trioxide. There may also be present in the beads small but variable amounts of water-soluble low molecular weight acids. The free sulfur trioxide can be removed by blowing an inert gas such as nitrogen, carbon dioxide, air, or helium through the resin, by vacuum degassing, or by washing the resin with a solvent or water. Washing with water or a solvent can be employed to leach out the small amount of low molecular weight acids which may be present.

For use in water softening, it is necessary to neutralize the acid resin to convert it to the sodium form. This can be done by treating the resin with a solution of sodium carbonate or hydroxide and rinsing to remove any excess base present. It is also possible to ship a dry mixture of the acid form of the resin plus the chemically equivalent amount of a neutralizing salt, such as sodium carbonate. When this mixture is charged to a water softening unit containing water, neutralization of the resin to the sodium form occurs automatically.

If it is desired to form the ammonium form of the resin, gaseous ammonia is passed through the resin retained in a bed or column. Not only are the sulfonic groups on the resin converted to the ammonium salts, but any free sulfur trioxide is also neutralized.

Amine salts of sulfonic cation exchange resins are frequently desired for special processes. They can be readily prepared by contacting the sulfonic acid form of the cation exchange resin, as produced by the process of the present invention, with a volatile organic amine. Typical of such volatile amines are mono-, di- and trimethylamines, ethylamines, butylamines, morpholine and aniline. At atmospheric pressure, the boiling point of amine should not greatly exceed 170° C., this being the temperature at which decomposition of the copolymer begins. However, the reactor in which the sulfonated copolymer is contacted with the gaseous amine can be operated under reduced pressure, thus allowing the use of amines, such as aniline, which boils at a temperature slightly higher than 170° C. at atmospheric pressure.

The amount of gas passing upflow through the bed can be varied over wide ranges and, if fluidization is desired, the rate will vary depending on the particle size of the copolymer. If beads in the range of 10 to 50 mesh are used, then gas velocities through the bed should be from about 0.6 to about 1.2 feet per second. Other factors which will affect the flow rate are temperature and pressure of the influent gas and sulfur trioxide content of the gas.

The temperature at which the sulfonation is effected may be varied over wide limits. The lower limit is set by the dew point of the sulfur trioxide in the air-sulfur trioxide mixture employed as the sulfonating agent. While the dew point for $SO_3$ is relatively high, it is lowered by the addition of the inert gas normally employed as a diluent. Thus, such diluted mixtures may show dew points as low as 15° C. The $SO_3$ will react with the copolymer at this temperature, but from a practical standpoint it might be impossible to maintain uniformly low temperatures because of the exothermic heat. The upper temperature is limited by the temperature at which the copolymer or sulfonated copolymer undergoes decomposition. This temperature is approximately 170° C. The amount of water-solubles present in the sulfonated product increases with increase in reaction temperature and, therefore, the reaction should be conducted at the lowest possible temperature which will give a reasonable rate of reaction. Employing a phase-separated styrene-divinylbenzene copolymer containing 20 percent divinylbenzene, a high degree of sulfonation was effected in 20 minutes at 56° C. and in 10 minutes at 92° C.

Although a high degree of sulfonation amounting to essentially one $HSO_3-$ group per aromatic nucleus is frequently desired, such is not always the case. Copolymers containing less than one $HSO_3-$ group per aromatic nucleus are suitable as catalysts for the acid-catalyzed reactions set forth hereinbefore. Furthermore, it is possible to sulfonate to a high degree of sulfonation by partially sulfonating in the normal fashion and then permitting the $SO_3$ adsorbed by the resin to complete the sulfonation by increasing the reaction temperature. This modification of the process of the present invention has the advantage of decreasing the amount of residual $SO_3$ which must be removed from the resin before it can be used.

The drawing shows a schematic diagram of a unit for operating the process of the present invention in a continuous manner. The mixture of sulfur trioxide with the inert gas, air generally being the inert gas, is fed to the bottom of the reactor through a distribution system which is so designed as to give a stream of gas of uniform velocity across the entire cross section. The flow is adjusted so that the bed of copolymer is in a fluidized condition. The copolymer is fed to the reactor by star valve, etc. and in the preferred embodiment the feed is below the top of the bed of copolymer. As the degree of sulfonation increases, the density of the copolymer beads increases and they gradually migrate to the bottom of the bed where they are continuously removed. As shown, air is blown through the sulfonated product to remove the sulfur trioxide therein. Any beads or particles which are not phase-separated do not sulfonate to any appreciable extent under these conditions and gradually migrate to the top of the bed where they may be removed or carried over in the air stream. The unused sulfur trioxide is compressed and recycled to the reactor.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted.

Example I

Five grams of copolymer beads having the composition described on col. 4 and prepared by a procedure similar to that described on col. 4 were placed on a sintered glass filter disk within a glass reactor tube 4" high and 1" in diameter. Dry air was passed over ten grams of liquid sulfur trioxide in a flask maintained at 40° C. with an oil bath. The dry air and vaporized sulfur trioxide were introduced into the reactor tube below the glass filter until all of the sulfur trioxide had evaporated (about 15 minutes). The beads were maintained at 80° to 100° C. during this period by heating the air-sulfur trioxide stream as necessary before it entered the reactor. The sulfonated copolymer was then cooled and dumped into an excess of 25% aqueous sodium hydroxide solution. The salt splitting capacity of the sodium form of the sulfonated product was measured and found to be 4.13 meq. per gram of dry sulfonated copolymer.

Example II

A sulfonation was conducted in a similar manner to that of Example I except that the air-sulfur trioxide stream was continuously recirculated for 30 minutes. The salt splitting capacity of the sodium form of the sulfonated product was measured and found to be 4.48 milliequivalents per gram of dry sulfonated copolymer.

Example III

Copolymer beads having the composition described in Example I and prepared by a procedure similar to that described in Example I were fed into the top of a tubular reactor at the rate of about one gram per minute. An air-sulfur trioxide stream consisting of about 20% by volume of sulfur trioxide was fed into the reactor near the bottom counterflow to the beads. The sulfonated beads settled to the bottom of the reactor where they were continuously removed. The hold time in the reactor which was kept at 60° to 100° C. was about 30 minutes. The product from the reactor had a measured salt splitting exchange capacity of 4.30 milliequivalents per gram dry.

We claim:

1. A process for the preparation of polymers having sulfonic acid groups attached to the polymer chain which comprises passing gaseous sulfur trioxide upwardly through a reactor containing particles of cross-linked vinyl polymer which are at least about 297 microns in size, have a macroreticular structure and contain aromatic nuclei at a rate sufficient to fluidize the contents of the reactor, maintaining this rate until the particles are substantially completely sulfonated, and recovering the sulfonated product.

2. A process as set forth in claim 1 in which the substantially completely sulfonated polymer is continuously removed from the bottom of the reactor while an equivalent amount of unsulfonated polymer is fed into the top of the reactor.

3. A process as set forth in claim 1 in which the sulfur trioxide stream is continued until each mole of aromatic nucleus contains one sulfonic acid group.

4. A process as set forth in claim 1 in which the reaction temperature is from about 50° C. to about 90° C.

5. A process as set forth in claim 1 in which the sulfur trioxide is diluted with a gas selected from the group consisting of nitrogen, carbon dioxide, sulfur dioxide, and air.

6. A process as set forth in claim 2 in which the sulfur trioxide in the effluent from the reactor is compressed and recycled.

7. A process as set forth in claim 1 in which the recovered sulfonated product is treated with a compound selected from the group consisting of gaseous ammonia and volatile organic amines.

References Cited by the Examiner

UNITED STATES PATENTS 2,716,587  8/1955  Hillard _____ 23—1
2,945,842  7/1960  Eichorn et al. _____ 260—79.3

FOREIGN PATENTS 1,205,505  2/1960  France.
1,075,318  2/1960  Germany.

OTHER REFERENCES

Helfferich, Ion Exchange, pages 60–61, McGraw-Hill Book Co., New York (1962).

Rohm and Haas Company, Macroreticular Anion Exchangers, IE–81–63, October 1963, 2 pages.

WILLIAM H. SHORT, *Primary Examiner.*

H. N. BURSTEIN, J. R. LIEBERMAN, *Examiners.*